Sept. 14, 1926.

V. A. FYNN 1,599,754

ALTERNATING CURRENT MOTOR

Filed Nov. 26, 1923

Inventor.
VALÈRE ALFRED FYNN.
By John H Bruninga
His Attorney.

Patented Sept. 14, 1926.

1,599,754

UNITED STATES PATENT OFFICE.

VALÈRE ALFRED FYNN, OF ST. LOUIS, MISSOURI.

ALTERNATING-CURRENT MOTOR.

Application filed November 26, 1923. Serial No. 677,157.

My invention relates to alternating current motors in which a revolving field of more or less uniform magnitude is produced at least during the starting period. More particularly it relates to polyphase synchronous induction motors.

The objects and features of this invention will appear from the description and drawings, and will be more particularly set forth in the claims.

Figure 4:
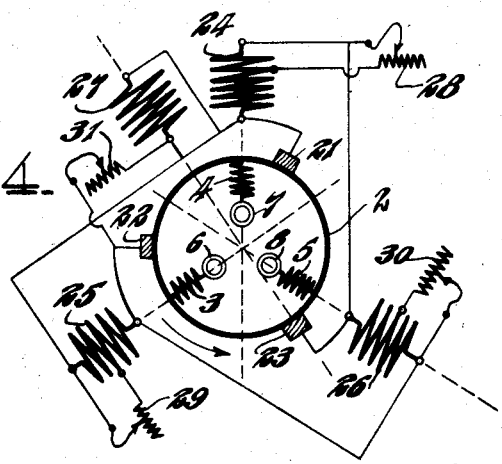
Figure 5:
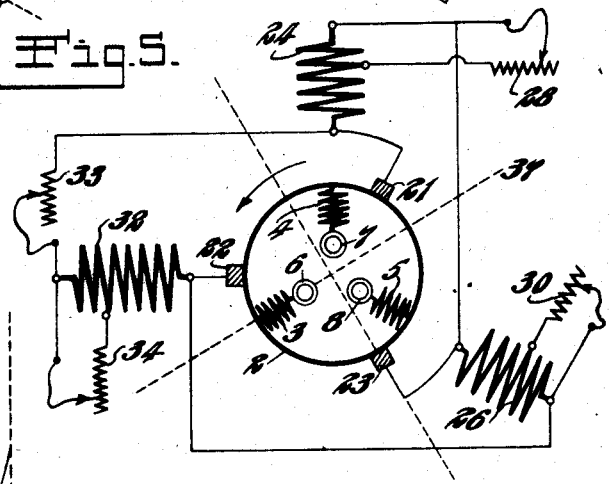
Figure 6:
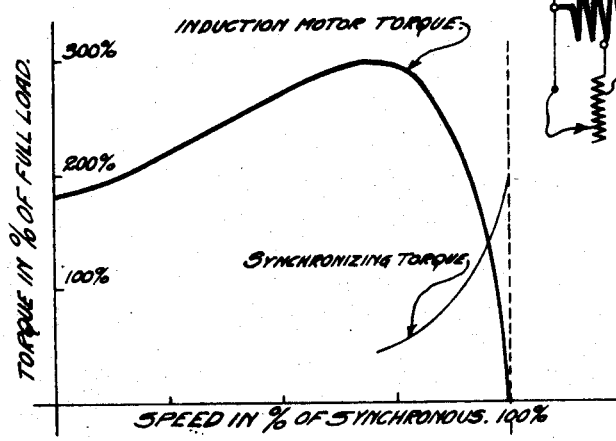

The accompanying diagrammatic drawings, Figures 1 to 5 inclusive, illustrate various embodiments of my invention as applied to two-pole motors, and Figure 6 is a diagram illustrating the operation.

Figure 1:
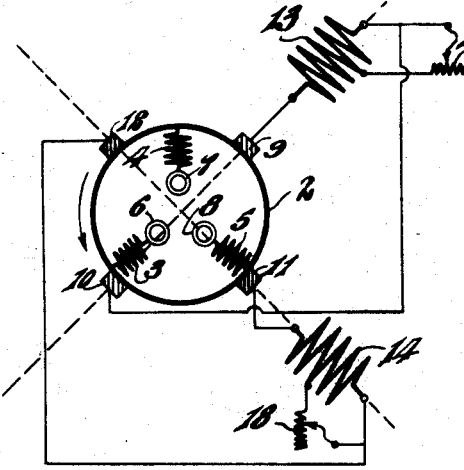

Referring to Figure 1, which represents a machine with revolving primary, the latter carries a commuted winding 2 and a three-phase star connected winding 3, 4, 5, one end of each phase being connected to one of the slip-rings 6, 7, 8, and the other to a point on the commuted winding, the latter being located in the central or neutral point of the polyphase star connected winding. Co-operating with the commuted winding 2 and here shown as directly resting on the same, is a polyphase arrangement of brushes 9, 10, 11, 12, each being displaced from the next following by 90 electrical degrees. It is understood that in practice these brushes would co-operate with a commutator suitably connected with the commuted winding. By showing the brushes as directly bearing on the commuted winding, any indefiniteness as to brush position which might be introduced by the leads between the winding and commutator is eliminated. The stationary element carries the windings 13, 14, each located in the axis of the pair of brushes to which it is connected. The winding 13 is connected to the brushes 9, 10 and the winding 14 to the brushes 11, 12. Part of the windings 13 and 14 are adapted to be shunted or even short-circuited by means of the adjustable resistances 17 and 18. Instead of combining the windings on the primary as shown, two windings may be used which are independent of each other, one being connected to a commutator and the other to slip-rings.

Figure 2:
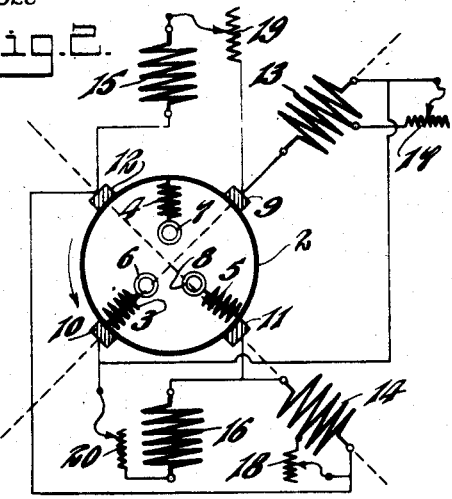

Figure 2 illustrates another embodiment and similar parts are designated by the same reference characters as in Figure 1. The additional stator windings 15 and 16 are located in an axis perpendicular to or displaced by 90 electrical degrees from the axis of the brushes to which they are connected. The resistance in the circuits comprising the windings 15, 16 can be changed by means of the adjustable resistances 19 and 20.

Figure 3:
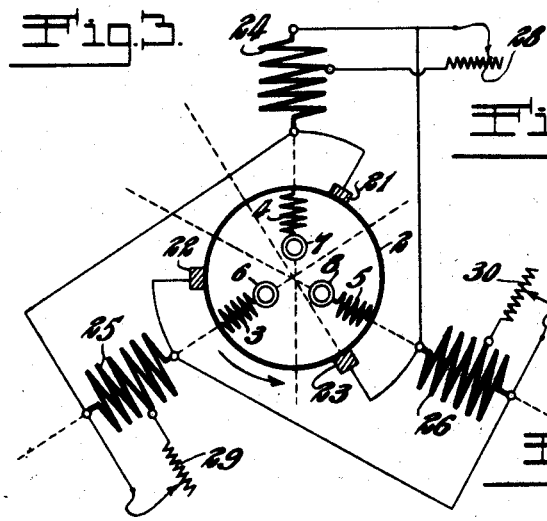

Figure 3 which also shows a machine with a revolving primary identical with that illustrated in Figure 1, displays a three-phase arrangement of brushes co-operating with the commuted winding and again shown as directly bearing on the same. The stator carries a three-phase arrangement of windings 24, 25, 26, each located in the axis of the brushes to which it is connected. Thus the stator winding 24, which is connected to the brushes 21, 23, is located in the vertical axis which is that of the brushes named. The winding 25 connected to the brushes 21, 22 is displaced from the vertical in a counter-clockwise direction by 120 electrical degrees and, therefore, located in the axis of the brushes 21, 22 to which it is connected. Similarly, the winding 26 lies in the axis of the brushes 22, 23, which is displaced from the vertical by 120 electrical degrees in a clockwise direction. A part of each of these windings can be shunted or short-circuited by the resistances 28, 29 and 30.

Figure 4 illustrates another embodiment, and similar parts are designated by the same reference characters as in Figure 3. Here the stator also carries a winding 27 located in an axis displaced by 90 electrical degrees from the axis of the brushes to which it is connected. The winding 27 is connected to the brushes 21, 22 with the interposition of the regulating resistance 31.

In connection with Figure 4, it will be noted that the windings 27 and 25 are connected in parallel to the brushes 21 and 22 and produce a resultant magnetization, the axis of which is displaced from the axes of the windings 25 and 27. These two windings can be combined into a single winding adapted to produce a magnetization equal in magnitude and direction to the resultant magnetization produced by said two windings. This is shown in Figure 5 in which the stator winding 32 replaces the windings 25 and 27 of Figure 4 and is provided with circuit controlling resistances 33 and 34. The lines 36 and 37 show the locations of windings 27 and 25 of Figure 4.

In operating the machine shown in Figure 1, if the resistances 17 and 18 are left on open circuit and phase displaced or polyphase voltages applied to the slip-rings 6, 7, 8, whether equally spaced as to time as in a standard three-phase system or unequally spaced as in most commercial split-phase systems, the primary will produce a revolving flux which will induce secondary currents in the windings 13 and 14 located on the secondary member and the reaction between said secondary currents and the primary revolving flux will cause the primary element to rotate and reach a speed near the synchronous just like in an asynchronous motor. When near the synchronous speed, the voltages induced in 13 and 14 will be small, becoming zero at synchronism, thus making the induction motor torque zero, but the auxiliary voltages generated in the commuted winding 2 of the primary and appearing at the brushes 9, 10 and also at the brushes 11, 12 will at all times be proportional to the magnitude of the revolving flux produced by the primary and to the speed with which said flux cuts the conductors of the commuted winding. When the axis of F is at right angles to that of R all of the F ampere-turns produce torque in conjunction with R, but when this angular relation between F and R changes, then only that component of F which is at right angles to R remains effective in so far as torque production is concerned. This speed will always be equal to the synchronous regardless of the speed at which the primary revolves and so far as the magnitude of the primary revolving flux is concerned it generally increases as synchronism is approached for the reason that that magnitude of the secondary currents diminishes and also because their phase changes. The brush or auxiliary voltage, therefore, is always proportional to the magnitude of the primary flux, but its periodicity changes, diminishing as synchronism is approached and becoming zero at synchronism. For these reasons, it is my belief that as synchronism is approached the brush voltage in the circuits in the windings 13, 14 becomes preponderant and determines the magnitude and phase of the currents in said windings. Since at very low periodicities the impedance of the circuits comprising the windings 13 and 14 must be very low, there will be a very small phase difference between the voltage and the current in either circuit and phase coincidence may be assumed without committing a material error. Now the currents produced in the windings 13 and 14 by the corresponding brush voltages can and do react with the primary revolving flux to produce a torque which increases as the ordinary induction motor torque decreases while the speed approaches the synchronous. This additional torque I refer to as a synchronizing torque, for it is capable of bringing a machine, first started as an induction motor, into synchronism, and one aim or object of this invention is to make this synchronizing torque as large and as continuous as possible. To make it as large as possible, I have disposed the winding 13 in the axis of the brushes 9, 10 to which it is connected because maximum synchronizing torque can only be had when the axis of the primary revolving flux is practically at right angles to or is displaced by 90 electrical degrees from the axis of 13 at a time when 13 carries the maximum brush current. To make the synchronizing torque continuous, I have added a second pair of brushes 11, 12 and a second stator winding 14 similarly located with respect to said brushes but displaced by 90 electrical degrees from 13, thus producing a polyphase arrangement of brushes and windings capable of producing a polyphase and, therefore, practically uniform synchronizing torque. When the machine has reached its synchronous speed, the brush voltage becomes unidirectional and the windings 13 and 14 produce a unidirectional magnetization. Under certain conditions the machine can operate as a synchronous motor until its overload capacity as such has been reached, after which it will continue to run under its starting conditions, namely, as an asynchronous motor. The operation of the machine near synchronism is well illustrated in Figure 6. In this figure the induction motor torque is shown for a given amount of resistance in the secondary and the synchronizing torque curve is based on the assumption that the secondary windings are so proportioned as to produce a synchronizing torque equal to about 1.9 times the full load torque. It is to be understood that this curve is approximate as to shape and merely included to facilitate the conception of the two overlapping torques.

At the moment of starting as an induction motor, the secondaries 13 and 14 are seen to be closed by way of the brushes 9, 10 and 11, 12 through the commuted winding 2 which has a certain amount of reactance. This reactance produces an unwelcome phase difference in the secondary windings, reducing the torque per ampere and all of the secondary currents have to pass the two sets of brushes. While this is entirely permissible in the smaller machines, I prefer, particularly in the case of larger ones, to close a part of each of the windings 13 and 14 over a non-inductive resistance, thus providing a second path for the secondary induced currents and one which has less reactance than that which comprises the commuted winding 2.

The windings 13 and 14 can be shunted by the adjustable resistances 17, 18, thus not only improving the torque per ampere, but also relieving the brushes from the necessity of carrying all the starting currents. After the machine has reached a speed equal to or near the synchronous, the shunts around part of the windings 13 and 14 can be interrupted, thus making the whole of these windings available for producing the unidirectional magnetization desired for synchronous operation. In this way I secure all the advantages of a regular polyphase starting winding on the secondary without having to provide additional space for such winding or additional labor to locate it on the secondary. Since such a winding is not operative at synchronous speed except in single-phase machines, it is desirable to dispense with it whenever possible.

A preferred way of causing the motor to operate synchronously over a range of loads is to make use of at least one of the windings 15 or 16, shown in Figure 2. If one or both are to be used, their circuits can be closed at the moment of starting or after the machine has reached its synchronous speed. If closed at starting, they will contribute to the starting as an induction motor but when near synchronism they will at times develop a positive and at other times a negative synchronizing torque, thus disturbing the constancy of said torque but at no time reducing it materially or to zero. When one or both of these windings are used in normal operation, they are connected to produce a maximum unidirectional magnetization displaced by 90 electrical degrees from the unidirectional magnetization simultaneously produced by the combined windings 13 and 14. One of these magnetizations, for instance the latter, will then oppose the primary armature reaction and may or may not contribute to the unidirectional excitation of the machine produced by the other.

Referring to Figures 3, 4 and 5, the arrangement is similar, except that there is a three-phase arrangement of brushes co-operating with the primary and a corresponding three-phase arrangement of secondary windings located on the stationary member and connected to said brushes. In addition to this, the winding 27 is connected to the brushes 21, 22 and located in an axis perpendicular to that of the said brushes. This winding corresponds to the winding 15 or 16 of Figure 2 or to both of these, the brushes 21, 22 corresponding to the brushes 9, 12, or 11, 10.

Another object and advantage I secure by the arrangement of brushes shown is the possibility of applying less than the maximum available commuted voltage to one or more windings on the secondary. Thus the windings 15 and 16 of Figure 2 receive but little more than .7 of the maximum available voltage and none of the windings of Figures 3, 4 or 5 receive the maximum available commuted voltage.

It is of advantage in machines of the type herein described to impress as low a brush voltage as possible on the secondary windings. The lower this voltage the smaller the number of turns in the secondary windings connected to the brushes and, therefore, the lower the voltage induced in them at the moment of starting. The way of securing this reduced voltage here disclosed consists in the main in deriving it from the commuted winding by means of brushes displaced by less than 180 electrical degrees.

In order to get the full benefit of the combination of elements herein disclosed, it is necessary to make the stationary as well as the revolving member without defined polar projections just as is usual in the case of polyphase induction motors, and I also prefer to build and operate these machines with a short air-gap or small clearance between the two members. The stationary member should be built like a stator, the revolving one like a rotor.

It will, therefore, be seen that in accordance with this invention, at starting, the currents of different phases flowing in the displaced circuits of the primary winding produce or set up a primary revolving flux; this induces secondary torque producing currents in the circuit or circuits formed by the windings on the secondary so as to start the machine as a polyphase induction motor. The primary revolving flux, moreover, produces or sets up in the commuted winding on the primary, voltages which appear at the commutator brushes as auxiliary or synchronizing voltages of differing phases. These voltages are of slip frequency and therefore become unidirectional at synchronism. These auxiliary voltages are impressed on the circuits formed by the windings on the secondary and cause the flow of currents therein, setting up ampereturns and a revolving synchronizing flux or revolving synchronizing ampereturns, which near synchronism and in conjunction with the primary flux produce a synchronizing torque. While, therefore, the induction motor torque drops as synchronism is approached as shown in Figure 6, the synchronizing torque is maintained and even increases as synchronism is approached.

Figure 1 shows a two-phase arrangement of brushes on the commutator adapted to impress two-phase voltages on a two-phase arrangement of secondary windings 13, 14; stated differently, the windings 13, 14 are displaced by 90 electrical degrees and the axes of the brushes 9, 10 and 11, 12 are also displaced by 90 electrical degrees, in consequence the phases of the two auxiliary voltages are displaced by a phase angle of 90 degrees. The same is true of Figure 3 which shows a corresponding three-phase arrangement with 120 degree displacements. The angular relation of the axis of each secondary to the axis of the brushes to which it is connected is the same throughout.

The two auxiliary voltages in Figure 1 have the same maximum amplitude and so have the three auxiliary voltages of Figure 3. If, in these figures, all of the secondary windings are designed to produce the same number of maximum conduced ampereturns the resulting synchronizing torque will be constant and a maximum because each winding is coaxial with the axis of the brushes to which it is connected and each therefore produces a strictly unidirectional synchronizing torque. The sum of these several unidirectional torques of equal amplitude results in a constant resultant synchronizing torque. The term "conduced ampereturns" is used to differentiate the secondary ampereturns due to an auxiliary voltage impressed on a secondary winding from those secondary ampereturns which are due to a voltage generated in such a winding by the primary revolving flux.

If the number of maximum conduced ampereturns is not the same in each of the secondary windings, as when a part of each of said windings is shunted as shown in Figs. 1 and 3, then the amplitudes of the component unidirectional synchronizing torques are not the same and the resultant synchronizing torque loses its constancy but remains continuous.

In Fig. 2 there are four auxiliary voltages those appearing at the brushes 9, 10 and 11, 12 are displaced by a phase angle of 90 degrees, those appearing at the brushes 9, 12 and 10, 11 are cophasal and displaced by a phase angle of 45 degrees from one of the former. The windings 13, 14 are displaced by 90 electrical degrees one from the other, the windings 15, 16 are coaxial and displaced by 45 electrical degrees from one of the former but, while the angular relation between the axis of the winding 13 and the axis of the brushes 9, 10 is the same as that between the axis of 14 and that of 12, 11, these axes coinciding, the axis of 15 and 16 is displaced by 90 electrical degrees from that of 9, 12 and 10, 11. Under these conditions the secondary is not magnetized along axes which all bear the same angular relation to the corresponding brush axes, as is the case in Figs. 1 and 3. The component synchronizing torques due to 13, 14 are strictly unidirectional and may be of same amplitude but the component synchronizing torques due to 15, 16 are of double slip frequency with equal positive and negative maxima. Under these conditions the resultant synchronizing torque is not constant but may be still continuous even though the number of maximum conduced ampereturns is the same in all the secondary windings. The same is true of Fig. 4 and for the same reasons.

As to Fig. 5 the auxiliary voltages differ in phase by 120 degrees but the three secondary windings on which said voltages are impressed are displaced by space angles other than 120 electrical degrees and do not all produce the same number of maximum conduced ampereturns since 32 is dimensioned to produce a magnetization equal in magnitude and direction to the resultant magnetization produced by the windings 25 and 27 of Fig. 4. In consequence the component synchronizing torques are neither of same configuration nor of same amplitude and the resultant synchronizing torque is continuous but not constant.

It is seen that the configuration of the synchronizing torque depends on the dimensioning of each secondary winding with respect to the auxiliary voltage impressed on same; on the angular displacement of said windings, expressed in electrical degrees, as compared with the angular displacement of the axes of the commutator brushes connected to said windings and expressed in the same manner, or, in other words, as compared with the phase displacement between the phases of the auxiliary voltages impressed on said secondary windings and expressed in phase angle degrees; and also on whether or not the angular relation which the axis of a secondary winding bears to the axis of the brushes to which it is connected is the same for each secondary winding.

Turning to the synchronous operation of Figures 1 and 3, the secondary is magnetized along axes which all bear the same angular relation to the corresponding brush axes and if the maximum conduced ampereturns in each of the secondary windings 13, 14 or 24, 25, 26 are the same then the axis of the resultant secondary magnetization F, which magnetization is unidirectional at synchronism, will preserve a displacement of substantially 90 electrical degrees from the resultant motor magnetization R, regardless of any angular displacement of R. While a motor which is constituted as assumed, may pass through synchronism it cannot operate as a synchronous motor because of the constant angular displacement between F and R coupled with the fact that the magnitude of F cannot vary unless the motor speed departs from the synchronous.

The maximum conduced ampereturns produced by 13, 14 of Fig. 2 may be the same and this may also be true of the maximum conduced ampereturns produced by 24, 25, 26 of Fig. 4 in which case the axis of the secondary unidirectional magnetization due to either group of windings will, at synchronism, maintain a substantially quadrature relation to the axis of R and a constant value regardless of any angular displacement of R. The magnetization due to 15, 16 of Fig. 2 or to 27 of Fig. 4, is also unidirectional at synchronism but with changing load i. e. with changing angular displacement of R, it changes not only its magnitude but also the angular displacement of its axis with respect to the axis of R. In consequence the resultant secondary magnetization F, that which results from the magnetizations produced by all of the secondary windings in Figs. 2 or 4, changes its magnitude as well as its angular space relation with respect to R whenever R moves with respect to the brushes cooperating with the commuted winding on the primary, and R does so move whenever the synchronous load changes. This is one reason why these motors do operate synchronously over a wide range of loads.

In Fig. 5 the maximum conduced ampereturns produced by each of the three secondary windings have different values and the axes along which the secondary is magnetized bear different angular relations to the corresponding brush axes. The motor of Fig. 5 is capable of running synchronously at a plurality of loads for either of these reasons because either is sufficient to cause the resultant secondary magnetization F to change as to magnitude and as to angular displacement with respect to R whenever R changes its angular relation to the axes of the commutator brushes. This happens whenever the synchronous load changes. Any conditions which produce a resultant continuous but not constant synchronizing torque also cause the machine to operate synchronously over a range of loads.

When the primary is stationary the revolving flux revolves synchronously with respect to it and the secondary revolves in the same direction as this revolving flux. In a synchronous operation, the speed of the secondary is a little short of that of the revolving flux; at synchronism the speed of the secondary is the same as that of the revolving flux. In applying this invention to a stationary primary, the brushes co-operating with the commuted winding on the primary must revolve with the secondary but the operation of the machine will be as here explained for the converse arrangement. It will be clear that various changes may be made in details of this disclosure without departing from the spirit of this invention, and it is, therefore, to be understood that this invention is not to be limited to the specific details here shown and described.

It is to be understood that by "synchronizing torque" I mean that torque which brings a synchronous motor up to synchronism, i. e. up to that speed which is determined by the number of poles of the machine and the frequency of the supply. It is known that an induction motor operates by virtue of secondary currents induced or generated in the secondary windings and that these currents and therefore the induction motor torque become zero at synchronism. Specifically in the case of motors started as induction motors and operated as synchronous motors, the synchronizing torque is one which is superposed on the said induction motor torque and does not become zero at synchronism, but preferably increases as synchronism is approached. The synchronizing torque is not to be confused with the "synchronous torque" or with that prevailing when the machine operates as a synchronous motor. The former has heretofore been a pure alternating torque with equal positive and negative maxima, I have elsewhere shown how a unidirectional or a substantially unidirectional synchronizing torque can be produced, in this application I show how a constant or a more or less constant but continuous synchronizing torque can be secured.

It is further to be understood that by "synchronous motor" is meant one which operates at a constant synchronous speed over a range of loads, and not, for instance, an adjustable speed asynchronous induction motor, the speed of which changes with every change of load, and which for certain settings may pass through synchronism in the course of its operation. The fact that it so passes through synchronism does not, of course, rob it of its distinguishing and inherent variable speed characteristic.

The synchronous motors described in this specification carry unidirectional ampereturns on their secondary, the resultant of which is referred to as F, and unless the organization of the machine is such as to permit, with changing torque demand (1) of an angular displacement between the axis of F and the axis of the resultant motor magnetization R, or (2) of a change in the magnitude of F, or (3) of said angular displacement and of said change in magnitude, the motor cannot and does not run at a constant and synchronous speed under varying load conditions and is not a synchronous motor.

Such subject matter as is disclosed in connection with my Figs. 4 and 5 and not specifically claimed in this application is specifically claimed in application Serial Number 126,686 filed by me August 2, 1926.

Having thus described the invention, what is claimed is:

1. The method of operating a motor, which carries variable load at synchronous speed, comprising, producing on the secondary near synchronism, synchronizing torque producing ampereturns the axis of the resultant of which revolves at slip frequency with respect to the secondary and maintaining the resultant ampereturns at a positive value until zero frequency and synchronism are reached.

2. The method of operating a motor which carries variable load at synchronous speed, comprising, producing on the secondary near synchronism, synchronizing torque producing ampereturns the axis of which revolves at slip frequency with respect to the secondary and increasing the synchronizing effectiveness of the synchronizing torque producing ampereturns as synchronism is approached.

3. The method of operating a motor which carries variable load at synchronous speed, comprising, producing a primary flux which revolves with respect to the primary, causing the primary flux to generate secondary torque producing ampereturns at starting, producing on the secondary near synchronism synchronizing torque producing ampereturns the axis of which revolves at slip frequency with respect to the secondary and maintaining the magnitude of the synchronizing ampereturns until zero frequency and synchronism are reached.

4. The method of operating a motor which carries variable load at synchronous speed, comprising, producing on the secondary synchronizing torque producing ampereturns the axis of the resultant of which revolves at slip frequency with respect to the secondary causing the magnitude of the resultant ampereturns to vary while their axis revolves and maintaining the resultant ampereturns at a positive value until synchronism is reached.

5. The method of operating a motor which carries variable load at synchronous speed, comprising, producing between the stator and rotor near synchronism a continuous synchronizing torque and causing the torque to increase until synchronism is reached.

6. The method of operating a motor which carries variable load at synchronous speed, comprising, producing between the stator and rotor near synchronism a continuous synchronizing torque and causing the torque to lock the motor in synchronism.

7. The method of operating a motor which carries variable load at synchronous speed, comprising, causing currents of differing phases to flow in displaced primary circuits in order to produce a primary flux which revolves with respect to the primary, producing auxiliary phase displaced voltages of slip frequency and of amplitudes independent of the slip, impressing the auxiliary voltages on displaced secondary circuits in inductive relation to the primary flux in order to produce secondary auxiliary ampereturns the axis of the resultant of which revolves at slip frequency with respect to the secondary and adjusting the phase of the auxiliary ampereturns to produce in cooperation with the primary flux a continuous synchronizing torque.

8. A motor which carries variable load at synchronous speed, having a primary member adapted to produce a primary flux which revolves with respect to the primary, a secondary member having displaced windings, a source of auxiliary phase displaced voltages of slip frequency and of amplitudes independent of the slip, and means for impressing the auxiliary voltages on the displaced secondary windings adapted to produce secondary ampereturns the axis of which moves at slip frequency with respect to the secondary and which cooperate with the primary flux to produce a continuous synchronizing torque.

9. A motor which carries variable load at synchronous speed, comprising, a primary member adapted to produce a primary flux which revolves with respect to the primary, a secondary member having displaced windings, said primary having a commutator and cooperating brushes adapted to collect auxiliary phase displaced voltages of slip frequency and of amplitudes independent of the slip, and means for impressing the auxiliary voltages on the displaced secondary windings to produce secondary ampereturns the axis of which moves with respect to the secondary and which are adapted to bring the motor up to synchronism and hold it there at a plurality of motor loads.

10. A motor which carries variable load at synchronous speed, having a primary member adapted to produce a primary flux which revolves with respect to the primary, a secondary member having displaced windings, a source of auxiliary phase displaced voltages of slip frequency and of amplitudes independent of the slip, means for impressing the auxiliary voltages on the displaced secondary windings to produce secondary ampereturns the axis of which moves at slip frequency with respect to the secondary and which cooperate with the primary flux to bring the motor up to synchronism, and means for causing the motor to operate synchronously at a plurality of loads.

11. A motor which carries variable load at synchronous speed, comprising, a primary member adapted to produce a primary flux which revolves with respect to the primary, a secondary member having displaced windings, said primary having a commutator and a polyphase arrangement of cooperating brushes adapted to collect auxiliary phase displaced voltages of slip frequency and of amplitudes independent of the slip, the said brushes being so connected to the displaced secondary windings that the axis of any set of brushes coincides with or parallels the axis of the secondary winding to which it is connected, and means for causing the motor to operate synchronously at a plurality of motor loads.

12. A motor which carries variable load at synchronous speed, having a primary member carrying a winding adapted to produce a primary flux which revolves with respect to the primary, a secondary member having displaced windings adapted to have generated therein secondary torque producing currents below synchronism which decrease as synchronism is approached, means for impressing voltages of differing phases on said secondary windings adapted to set up synchronizing torque producing currents which increase as synchronism is approached and means for causing the motor to operate synchronously at a plurality of loads.

13. A motor which carries variable load at synchronous speed, comprising, a primary and a secondary without defined polar projections, a winding on the primary member adapted to produce a primary flux which revolves with respect to the primary, displaced windings on the secondary member, said primary winding having a commutator and a polyphase arrangement of brushes connected with said secondary windings, the axis of one secondary winding coinciding with the axis of the pair of brushes to which it is connected, the axis of another secondary winding being displaced 90 electrical degrees from the axis of the brushes to which it is connected.

14. A motor which carries variable load at synchronous speed, comprising, a primary and a secondary without defined polar projections, said primary member being adapted to produce a primary flux which revolves with respect to the primary, and having a commutator and a polyphase arrangement of brushes on same, and means including said brushes for producing at synchronism displaced unidirectional magnetizations, one of which is coaxial with one pair of brushes and another which is displaced from another pair of brushes.

15. A motor which carries variable load at synchronous speed, comprising, a primary and a secondary without defined polar projections, said primary member being adapted to produce a primary flux which revolves with respect to the primary, and having a commutator and a polyphase arrangement of brushes on same, and means including said brushes for producing an induction motor torque at starting and for producing at synchronism a unidirectional magnetization adapted to hold the motor in synchronism at a plurality of motor loads.

16. A motor which carries variable load at synchronous speed, having a primary and a secondary without defined polar projections, a winding on the primary member adapted to produce a primary flux which revolves with respect to the primary, displaced windings on the secondary member adapted to have induced therein secondary torque producing currents below synchronism, and means for impressing voltages of different phases on said secondary windings adapted to set up synchronizing torque producing ampere-turns which increase as synchronism is approached, said voltages becoming unidirectional at synchronism and causing said secondary windings to produce unidirectional magnetizations along displaced axes.

17. A motor which carries variable load at synchronous speed, comprising, a primary and a secondary without defined polar projections, said primary member being adapted to produce a primary flux which revolves with respect to the primary, and having a commutator and a polyphase arrangement of brushes co-operating with same, said secondary member having displaced windings, two of which windings are connected to different sets of brushes and disposed in the axis of the brushes to which they are connected and another of said windings being displaced 90 electrical degrees from the axis of the brushes to which it is connected.

18. A motor which carries variable load at synchronous speed, comprising, a primary member having a winding provided with a commutator and brushes, and a secondary member having a winding connected to said brushes to carry a unidirectional current at synchronism, said secondary winding being adapted to have induced therein torque producing currents at starting, and a shunt path around part of said secondary winding adapted to relieve the commuted winding of at least part of the secondary current at starting.

19. A motor which carries variable load at synchronous speed, comprising, a primary member having a winding provided with a commutator and brushes, and a secondary member having a winding connected to said brushes to carry a unidirectional current at synchronism, said brushes being displaced by less than 180 electrical degrees.

In testimony whereof I affix my signature this 24th day of November, 1923.

VALÈRE ALFRED FYNN.

Certificate of Correction.

It is hereby certified that in Letters Patent No. 1,599,754, granted September 14, 1926, upon the application of Valère Alfred Fynn, of St. Louis, Missouri, for an improvement in "Alternating-Current Motors," errors appear in the printed specification requiring correction as follows: Page 2, line 23, strike out the paragraph beginning with the word "When" and ending with the word "concerned," line 30, and insert the same to follow the sentence ending in line 111, page 4; page 3, line 49, strike out the period between the numerals "21 and 22" and insert instead a comma; page 4, line 32, before the word "remains" insert the word *still*; and that the said Letters Patent should be read with these corrections therein that the same may conform to the record of the case in the Patent Office.

Signed and sealed this 26th day of October, A. D. 1926.

[SEAL.]

WM. A. KINNAN,
*Acting Commissioner of Patents.*